B. F. Stephens,
Pill-Box,
№ 84,972.     Patented Dec. 15, 1868.

Witnesses
Geo. D. Walker
Chas. H. Smith

Inventor;
B. F. Stephens

BENJAMIN F. STEPHENS, OF BROOKLYN, NEW YORK.

Letters Patent No. 84,972, dated December 15, 1868.

IMPROVED BOX FOR PILLS, &c.

The Schedule referred to in these Letters Patent and making part of the same.

*To all whom it may concern:*

Be it known that I, BENJAMIN F. STEPHENS, of Brooklyn, in the county of Kings, and State of New York, have invented, made, and applied to use a certain new and useful Improvement in Boxes for Pills, Troches, Confections, and similar articles; and I do hereby declare the following to be a full, clear, and exact description of the said invention, reference being had to the annexed drawing, making part of this specification, wherein—

Similar marks of reference denote the same parts.

Figure 2:
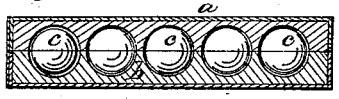
Figure 2 is a sectional view of the same closed.
Figure 1:
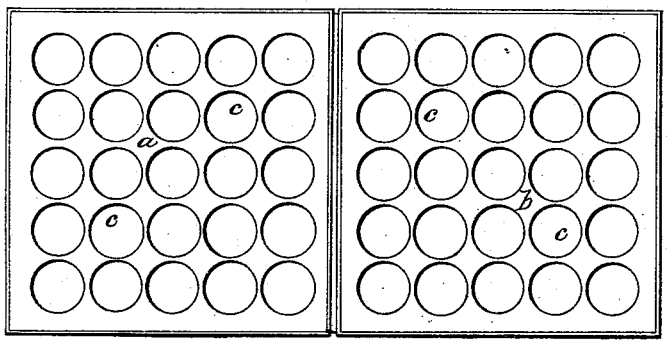
Figure 1 is a plan of the pill-box as opened.

In the manufacture of pills, it is usual to roll them in powdered materials, to keep them from adhering together in the box. This, however, is not effective, and the pills become stuck together, and very much distorted in shape. Besides this, the taste of the pill is objectionable, either from the powder in which it is rolled or from the exposure of the contents; and in the case of sugar-coated pills, the coating frequently tastes, in consequence of some of the ingredients of which the pill is composed, partially evaporating, or impregnating the sugar.

Confections and granules are often made with liquid materials inside of them, and they are very likely to become stuck together, and the contents allowed to escape through cracks in the confection or granule.

Troches are also liable to adhere together in the box, and thereby be rendered useless.

In cases where sugar forms the exterior or coating of the pill, confection, or granule, the same becomes softened by heat or moisture, so that several will adhere together if in contact.

My invention is intended to separate and thereby preserve the granules, troches, pills, or confections in the proper shape, prevent them sticking together and becoming injured, and at the same time, by lessening the air-space remaining in the box between the pills or other articles, check or prevent the evaporation of the material forming the same. I effect this by making the box with a series of cavities, corresponding in size and shape, or nearly so, to the pills, troches, granules, or confections, said box being formed of two pieces pressed out of plastic material, with cavities in the surfaces that come together. The plastic material employed for forming the box may be water-proof, or the surface of the box may be coated or enamelled.

In the drawing—

*a* and *b* are the two parts forming the top and bottom of the pill-box. These are made of paper-pulp, or any suitable material that can be moulded or pressed to shape, with a series of cavities, *c*, in the faces that come together, so as to receive the pills, troches, granules, or confections, each in a separate cavity, and thereby preserve them as aforesaid.

Paper or other thin material pasted over the outside of the box serves to unite the top and bottom, (*a* and *b*,) and renders the parts air-tight.

This pill-box is a new article of manufacture that is very useful, as preserving the contents from contact and injury, and at the same time the cavities become a means for determining the number introduced into each box. A perforated piece of elastic material might be introduced between the surfaces of the box that come together.

What I claim, and desire to secure by Letters Patent, is—

A box pressed or formed of plastic material, with cavities in it, forming separate compartments for the pills, or similar articles, substantially as specified.

In witness whereof, I have hereunto set my signature, this 7th day of October, A. D. 1868.

BENJ. F. STEPHENS.

Witnesses:
CHAS. H. SMITH,
GEO. T. PINCKNEY.